US006996493B1

(12) United States Patent
Sikora et al.

(10) Patent No.: US 6,996,493 B1
(45) Date of Patent: Feb. 7, 2006

(54) PROGRAMMED COMPUTATION OF PREDICTED PRESSURE LOADS ON MARINE VESSELS

(75) Inventors: Jerome P. Sikora, Rockville, MD (US); Robert W. Michaelson, Arnold, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 31 days.

(21) Appl. No.: 10/778,708

(22) Filed: Feb. 11, 2004

(51) Int. Cl.
*G01K 17/00* (2006.01)

(52) U.S. Cl. .................................................. 702/138
(58) Field of Classification Search ................ 702/138, 702/136, 135; 524/431; 428/426, 413, 410; 700/289; 714/27, 37; 166/317; 501/7; 706/45; 228/183
See application file for complete search history.

(56) References Cited

U.S. PATENT DOCUMENTS

| 6,263,297 B1 | 7/2001 | Sikora et al. | |
| 2004/0107067 A1 * | 6/2004 | Ishii et al. | 702/136 |

OTHER PUBLICATIONS

Jerome P. Sikora and Robert W. Michaelson, "Probability Distributions for Secondary Loads," Naval Surface Warfare Center, Carderock Division, West Bethesda, Maryland 20817-5700, NSWCCD report 65-TR-2003/36, face-dated Sep. 2003 (22 pages) (Please note that the attached is a black & white/grayscale photocopy; figures 1-4, on pp. 9-10, are printed in color.)

* cited by examiner

*Primary Examiner*—John Barlow
*Assistant Examiner*—Tung Lau
(74) *Attorney, Agent, or Firm*—Howard Kaiser (57) ABSTRACT

Pressure data are obtained for a ship from sea trials and/or model tests conducted under various environmental (e.g., wave height, wave slam rate) and operational (e.g., ship speed, ship heading) circumstances. The pressure data are grouped into different "cells," each defined by a unique set of environmental and operational circumstances. As to each cell, the corresponding pressure data are statistically approximated into a two-parameter Weibull distribution so as to obtain a shape parameter and a scale parameter. Additional cells and their corresponding Weibull distributions can be interpolated or extrapolated from existing cells. All of the cellular information (Weibull-related and pressure-related) is merged in Weibull fashion into an all-embracing mathematical function that is holistically informative, in terms of all of the diverse environmental and operational circumstances that a ship can be expected to confront over its projected lifetime, about the reliability of one or more structural elements of the ship.

21 Claims, 8 Drawing Sheets

```
'HSS 5594 slam pressure operational profile
'number of speeds
6
'number of headings
5
'number of wave heights
3
'mean speeds - knots
0, 5, 15, 25, 35, 45
'mean headings - degrees off bow - 0 is head seas
0, 45, 90, 135, 180
'wave ht band definitions -
'wave hts defined in meters, up to 16 meters high max
'in 1 meter intervals (integers)
'band 1 -
1,3
'band 2 -
4,6
'band 3 -
7,16
'operational probabilities
'speed, heading, prob per wave height-
'given that the ship is operating in the given wave height,
'what is the probability of operating at the specified
'speed and heading
'spd  hdg    wvht1     wvht2     wvht3
 0,    0,    0.00125,  0.00125,  0.00125
 0,   45,    0.0025,   0.0025,   0.0025
 0,   90,    0.0025,   0.0025,   0.0025
 0,  135,    0.0025,   0.0025,   0.0025
 0,  180,    0.00125,  0.00125,  0.00125
 5,    0,    0.00625,  0.00625,  0.00625
 5,   45,    0.0125,   0.0125,   0.0125
 5,   90,    0.0125,   0.0125,   0.0125
 5,  135,    0.0125,   0.0125,   0.0125
 5,  180,    0.00625,  0.00625,  0.00625
15,    0,    0.00625,  0.00625,  0.05625
15,   45,    0.0125,   0.0125,   0.1125
15,   90,    0.0125,   0.0125,   0.1125
15,  135,    0.0125,   0.0125,   0.1125
15,  180,    0.00625,  0.00625,  0.05625
25,    0,    0.04375,  0.05625,  0.05
25,   45,    0.0875,   0.1125,   0.1
25,   90,    0.0875,   0.1125,   0.1
25,  135,    0.0875,   0.1125,   0.1
25,  180,    0.04375,  0.05625,  0.05
35,    0,    0.05625,  0.05,     0.00625
35,   45,    0.1125,   0.1,      0.0125
35,   90,    0.1125,   0.1,      0.0125
35,  135,    0.1125,   0.1,      0.0125
35,  180,    0.05625,  0.05,     0.00625
45,    0,    0.0125,   0.00625,  0.00625
45,   45,    0.025,    0.0125,   0.0125
45,   90,    0.025,    0.0125,   0.0125
45,  135,    0.025,    0.0125,   0.0125
45,  180,    0.0125,   0.00625,  0.00625
```

FIG. 4

HSS data

| | | | | | |
|---|---|---|---|---|---|
| 45 | 0 | 5 | 1.16 | 22.7 | 44.3 |
| 15 | 0 | 6 | 0.97 | 4.1 | 6.4 |
| 25 | 0 | 6 | 1.11 | 6.1 | 35 |
| 35 | 0 | 6 | 1.2 | 13.9 | 20.5 |
| 45 | 0 | 6 | 1.16 | 22.7 | 44.3 |
| 15 | 0 | 7 | 0.97 | 4.1 | 6.4 |
| 25 | 0 | 7 | 1.11 | 6.1 | 35 |
| 35 | 0 | 7 | 1.2 | 13.9 | 20.5 |
| 15 | 0 | 8 | 0.97 | 4.1 | 6.4 |
| 25 | 0 | 8 | 1.11 | 6.1 | 35 |
| 35 | 0 | 8 | 1.2 | 13.9 | 20.5 |
| 15 | 0 | 9 | 0.97 | 4.1 | 6.4 |
| 25 | 0 | 9 | 1.11 | 6.1 | 35 |
| 35 | 0 | 9 | 1.2 | 13.9 | 20.5 |
| 0 | 0 | 10 | 1.04 | 10.1 | 12 |
| 15 | 0 | 10 | 1.9 | 6.9 | 22 |
| 0 | 0 | 11 | 1.04 | 10.1 | 12 |
| 15 | 0 | 11 | 1.9 | 6.9 | 22 |
| 0 | 0 | 12 | 1.04 | 10.1 | 12 |
| 15 | 0 | 12 | 1.9 | 6.9 | 22 |
| 0 | 0 | 13 | 1.04 | 10.1 | 12 |
| 15 | 0 | 13 | 1.9 | 6.9 | 22 |
| 0 | 45 | 6 | 0.67 | 4.5 | 28.6 |
| 15 | 45 | 6 | 1.02 | 5.8 | 97 |
| 0 | 45 | 7 | 0.67 | 4.5 | 28.6 |
| 15 | 45 | 7 | 1.02 | 5.8 | 97 |
| 0 | 45 | 8 | 0.67 | 4.5 | 28.6 |
| 15 | 45 | 8 | 1.02 | 5.8 | 97 |
| 0 | 45 | 9 | 0.67 | 4.5 | 28.6 |
| 15 | 45 | 9 | 1.02 | 5.8 | 97 |
| 15 | 45 | 10 | 1.19 | 7.9 | 194.3 |
| 15 | 45 | 11 | 1.19 | 7.9 | 194.3 |
| 15 | 45 | 12 | 1.19 | 7.9 | 194.3 |
| 15 | 45 | 13 | 1.19 | 7.9 | 194.3 |

FIG. 5

Exceedance Results

| Pressure | # Times Exceeded |
|---|---|
| 127.36 | 1.000 |
| 122.27 | 1.406 |
| 117.18 | 1.972 |
| 112.08 | 2.762 |
| 106.99 | 3.862 |
| 101.89 | 5.390 |
| 96.80 | 7.510 |
| 91.70 | 10.448 |
| 86.61 | 14.516 |
| 81.51 | 20.149 |
| 76.42 | 27.954 |
| 71.32 | 38.793 |
| 66.23 | 53.903 |
| 61.13 | 75.111 |
| 56.04 | 105.218 |
| 50.95 | 148.748 |
| 45.85 | 213.554 |
| 40.76 | 314.436 |
| 35.66 | 481.682 |
| 30.57 | 781.564 |
| 25.47 | 1365.523 |
| 20.38 | 2586.409 |
| 15.28 | 5268.603 |
| 10.19 | 11322.663 |
| 2.55 | 36468.375 |

FIG. 6

Histogram Results
Pressure# Cycles at Pressure

| Pressure | # Cycles at Pressure |
|---|---|
| 124.82 | 0.406 |
| 119.72 | 0.567 |
| 114.63 | 0.790 |
| 109.53 | 1.100 |
| 104.44 | 1.528 |
| 99.34 | 2.120 |
| 94.25 | 2.938 |
| 89.16 | 4.068 |
| 84.06 | 5.633 |
| 78.97 | 7.806 |
| 73.87 | 10.839 |
| 68.78 | 15.110 |
| 63.68 | 21.208 |
| 58.59 | 30.107 |
| 53.49 | 43.530 |
| 48.40 | 64.806 |
| 43.30 | 100.882 |
| 38.21 | 167.246 |
| 33.11 | 299.882 |
| 28.02 | 583.959 |
| 22.93 | 1220.885 |
| 17.83 | 2682.195 |
| 12.74 | 6054.060 |
| 6.37 | 25145.712 |

FIG. 7

Reliability Results
Pressure   Reliability   Algorithm
=========================================

| Pressure | Reliability | Algorithm |
|---|---|---|
| 127.36 | 0.3678 | 127.36 |
| 131.19 | 0.4612 | 131.10 |
| 135.01 | 0.5497 | 134.85 |
| 138.83 | 0.6299 | 138.62 |
| 142.65 | 0.7000 | 142.40 |
| 146.47 | 0.7595 | 146.19 |
| 150.29 | 0.8090 | 150.00 |
| 154.11 | 0.8494 | 153.81 |
| 157.93 | 0.8820 | 157.64 |
| 161.75 | 0.9079 | 161.46 |
| 165.57 | 0.9284 | 165.29 |
| 169.39 | 0.9445 | 169.13 |
| 173.22 | 0.9571 | 172.99 |
| 177.04 | 0.9669 | 176.85 |
| 180.86 | 0.9745 | 180.71 |
| 184.68 | 0.9803 | 184.52 |
| 188.50 | 0.9848 | 188.33 |
| 192.32 | 0.9883 | 192.18 |
| 196.14 | 0.9910 | 196.03 |
| 199.96 | 0.9931 | 199.92 |
| 203.78 | 0.9947 | 203.78 |

Algorithm Slope    =    14.591
Truncation Value =    127.36
P(.9)                      0.9000        160.20
P(.99)                    0.9900        194.48
P(.999)  0.9990                         228.15

FIG. 8

PROGRAMMED COMPUTATION OF PREDICTED PRESSURE LOADS ON MARINE VESSELS

STATEMENT OF GOVERNMENT INTEREST

The invention described herein may be manufactured and used by or for the Government of the United States of America for governmental purposes without the payment of any royalties thereon or therefor.

BRIEF DESCRIPTION OF THE COMPUTER PROGRAM LISTING APPENDIX

Incorporated herein by reference is a Computer Program Listing Appendix, which sets forth an embodiment of computer source code in accordance with the present invention. The inventors refer to this embodiment of their computer program product as "MAXPRES." This Computer Program Listing Appendix is contained as a text document that was created on 22 Jan. 2004 in a CD-R compact disc that is now situated in the application file. The CD-R compact disc contains one data file in ASCII file format, about 66 KB, entitled "MAXPRESsourcecode.prg.txt."

BACKGROUND OF THE INVENTION

The present invention relates to loadings experienced by marine vessels, more particularly to methodologies for obtaining pressure loading predictions such as may be useful in the design of marine vessels.

Marine vessels (e.g., ships, small craft, high performance craft, etc.) are subjected to pressure loads induced by the sea. These pressure loads can be either of two types, viz., (i) a quasi-static pressure type load from the structure being below the water surface, or (ii) a slam-induced pressure load from a wave impacting on a part of the vessel. Historically, various algorithms have been developed to address both types of pressure loads, mainly using ship trial and model test data with some "engineering judgment" to arrive at pressure loads to be used for design. The design pressure is often a single value used to assess the adequacy of localized ship structure.

More recently, reliability and fatigue assessment methodologies have been developed for the design of global ship structures subjected to overall hull bending from wave action. These methodologies require the knowledge of the number of times that a given load will be experienced in the lifetime of the structure. For example, a peak design load may often be taken as the load that the structure might experience once in its lifetime. For loads that are less that the one cycle maximum, the structure will likely face these lesser loads more than once. Increasingly smaller loads will be experienced an increasing number of times during the life of the structure.

For ship structural components (e.g., metal plating, stiffeners, grillage, etc.), a similar process is needed to adequately assess the reliability and fatigue characteristics of the component. However, heretofore no method has existed to assess the cyclical nature of pressure loads on ship structural components due to wave slamming.

SUMMARY OF THE INVENTION

In view of the foregoing, it is an object of the present invention to provide a methodology for evaluating pressure loads that are associated with wave impacts (e.g., wave slamming or green seas) on marine vessels.

Seaway loads acting on ships fall into three basic categories: (i) primary or global hull girder bending loads; (ii) secondary or normal pressure loading on plating and grillages; and, (iii) tertiary or component loads. The present invention is concerned with those secondary loads that are dynamic in nature, viz., wave impacts from the ship moving into waves and green seas breaking over the bow. Marine vessels may experience significant slamming and green seas loadings. Failure to properly account for slam pressures during design may result in extensive damage to the hull. The present invention is to some degree founded upon the probabilistic nature of these loadings. Based upon model test and sea trial experiences, it is inventively observed that these loadings appear to often follow Weibull distributions.

Inventive principles are applicable to practically any structure that is subject to environmental influence. The inventive method can be practiced for assessing the fitness of a structure to withstand pressure loading occasioned by environmental interaction with the structure. Typically, such fitness is assessed over the course of a selected lifetime of the structure. The inventive method comprises: establishing plural cells, each cell containing information pertaining to at least one condition, the at least one condition including at least one environmental condition that is capable of affecting the structure; associating each cell with a Weibull distribution that relates the pressure loading to the probability of exceeding the pressure loading; and, combining all of the Weibull distributions, the combining including determining an overall character of the structure with respect to the pressure loading. Typically, each Weibull distribution is defined in terms of a Weibull shape parameter and a Weibull scale parameter; the combination of every Weibull distribution includes performing mathematical computation that considers every Weibull shape parameter and every Weibull slope parameter. Inventive practice is especially propitious with regard to structures that are movable vehicles such as marine vessels. According to such inventive embodiments, the at least one condition typically includes not only at least one environmental condition but also at least one operational condition of the vehicle. For marine vessels, frequent inventive practice provides for environmental condition(s) such as wave height and/or wave slam rate, and operational condition(s) such as marine vessel speed and/or marine vessel heading relative to the wave direction.

In accordance with many embodiments of the present invention, a computer program product, suitable for residence in the memory of a computer, is useful for outputting lifetime information relating to pressure associated with sea wave activity experienced by a marine vessel. The inventive computer program product comprises a computer useable medium having computer program logic recorded thereon. The current version of the present invention's MAXPRES program is exemplary of a computer program product embodiment that requires the inputting of environmental-operational pressure information (based on empirical observation of pressures to which the marine vessel is subjected, such as involving sea trials and/or model tests) into individual cells, and that further requires the inputting, as to each cell, of the two Weibull parameters (viz., shape parameter and scale parameter) of a two-parameter Weibull distribution. The environmental-operational pressure data are fit to Weibull distributions in advance of using the MAXPRES program. The computer program logic includes means for enabling input of pressure-related information so as to be grouped in accordance with a plurality of informational cells, and means for enabling calculation of at least one lifetime relationship that involves pressure and that is indicative regarding structural failure of the marine vessel. The pressure-related information includes sea state information, operation profile information and Weibull information. Each cell includes corresponding sea state information and corresponding operation profile information, and is characterized in terms of corresponding Weibull information that includes the scale parameter (also referred to herein as "characteristic value") and the shape parameter (also referred to herein as "slope" or "slope factor") of a Weibull distribution as a function of pressure. Each lifetime relationship is comprehensive as to all of the cells. The calculation is generally representative of a summation of all of the Weibull information corresponding to every cell.

It may be advantageous to practice the present invention by providing a computer program product that itself calculates the Weibull distribution fits to the raw environmental-operational pressure data obtained from sea trials and/or model testing. The computer program logic includes: means for enabling input of empirical pressure information into each of at least two informational cells; means for enabling characterization of each cell in terms of a corresponding Weibull distribution as a function of pressure; and, means for enabling calculation of at least one lifetime relationship that involves pressure and that is indicative regarding structural failure of the marine vessel. The empirical pressure information describes variation of pressure encountered by the marine vessel in accordance with sea state and operation profile. Each Weibull distribution describes a characteristic value and a slope factor. Each characterization of a cell is based upon empirical pressure information input into the cell. Each lifetime relationship is comprehensive as to all of the cells. The calculation is generally representative of a summation of all of the Weibull distributions corresponding to every cell.

The present invention provides a methodology for predicting pressure loads on a marine craft structure as induced by the sea. The engineer is enabled by the present invention to assess the structural reliability and fatigue properties of a structural component of a marine vessel, wherein the structural component is subjected to cyclical pressure loads from waves. Marine vessel structural components designed by traditional methods have experienced structural failures. A primary advantage of the present invention is to provide a more accurate estimate of the seaway pressure loads that structural components of marine vessels will be subjected to during its life.

The inventive methodology, as often embodied, is capable of predicting the maximum slam pressures on ships and their levels of reliability, using Weibull distributions. Weibull distributions are well known probability distributions in the statistical arts, especially known for describing lifetimes of entities such as parts, components or people. Incorporated herein by reference is Lewis, R., *An Assessment of Statistical Techniques and Current Assumptions for Analysis of Hull Girder Bending Response Time Histories*, NSWCCD report SSM-65-95/33, May 1995, which discloses statistical techniques for developing Weibull distributions from experimental data. The instant disclosure follows Lewis's notation.

According to typical inventive embodiments, Weibull distributions are required for each of a collection of lifetime operational "cells" (the time spent in a combination of ship speed, heading, and the sea state) in which slamming occurs. Each of these unique cells contributes to the cumulative reliability of an extreme pressure over the expected life of a ship at sea. Inventive practice also permits application of these maximum pressures in ship design. The inventive methodology is embodied in the aforementioned interactive computer program named "MAXPRES" (so-named as an abbreviation for "maximum pressure") being tested and evaluated by the U.S. Navy. According to the present invention's prototypical MAXPRES software, input includes—for each operational cell in which slamming occurs—the selection of a lifetime at sea, sea state probabilities of occurrence, operational profiles, and Weibull parameters. MAXPRES outputs lifetime exceedance pressures, corresponding histograms for fatigue studies, and the cumulative reliability as a function of pressure.

In terms of basic operation, the present invention's MAXPRES program defines the required input parameters as prompted by the program, and executes the program to provide the pressures as a function of the number of cycles of occurrence; that is, the inventive software tabulates the pressure load versus the number of times that pressure is experienced by the structural component. This information can be used to assess the structural reliability and fatigue characteristics of the structural component. A computer user with moderate skill should be able to execute the MAXPRES software with minimal instruction.

Some aspects of the present invention's method and computer program product (in particular, MAXPRES) are described in the following technical report, incorporated herein by reference, of the NSWCCD (Naval Surface Warfare Center, Carderock Division), principally located in West Bethesda, Md.: Jerome P. Sikora and Robert W. Michaelson, "Probability Distributions for Secondary Loads," NSWCCD report 65-TR-2003/36, face-dated September 2003. An embodiment of MAXPRES's computer source code is set forth herein in the Computer Program Listing Appendix.

Although real world pressures continuously vary from point to point over time, trying to define them in such a way is impractical. Consistent generally with design custom, the instant disclosure uses static equivalent pressures that are applied uniformly over the structural element. The term "pressure," as used herein, means an "equivalent static uniform pressure."

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 4 is a tabular representation of sample operational profile data such as may be input in accordance with the present invention's prototypical MaxPres program.

DETAILED DESCRIPTION OF THE INVENTION

The present invention provides a "cell" methodology according to which Weibull distributions are algorithmically combined in various ways that are indicative of the structural integrity, in response to loading, of one or more structural elements of an object such as a transport vehicle. According to many preferred inventive embodiments, the object is a ship or other marine vessel.

Figure 1:
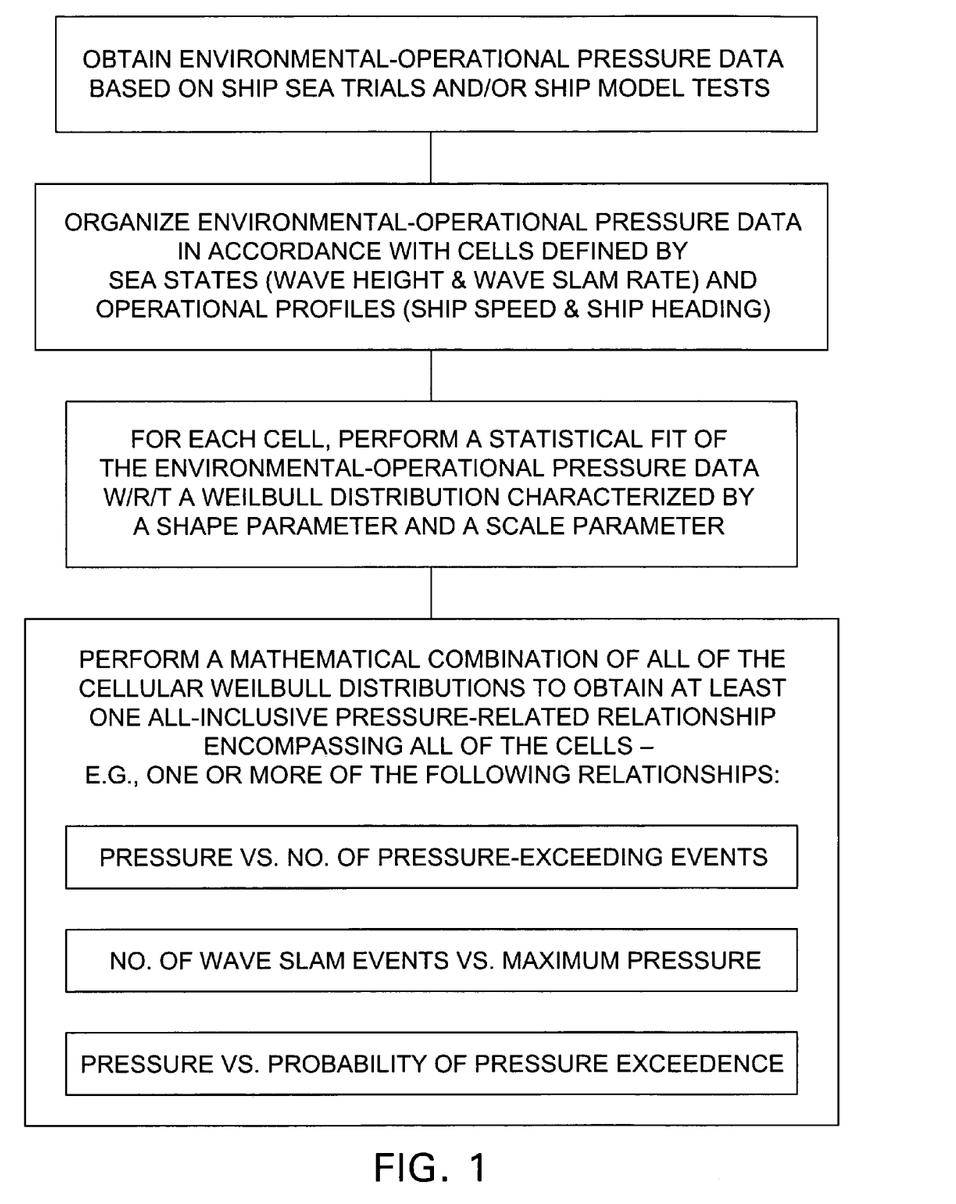
FIG. 1 is a flow diagram of typical practice in accordance with the present invention.

Referring now to FIG. 1, the present invention establishes plural cells, each cell being defined by at least one operational parameter (e.g., ship speed, ship heading, etc.) and at least one environmental (sea state) parameter (e.g., wave height, wave slam rate, etc.). Empirical data is, or has been, collected via ship sea trials and/or model ship testing. For at least twenty-five years, NSWCCD has been collecting slam impact responses and pressure data, as well as green seas pressure data, on a variety of ships (e.g., TAGOS-19, CG-47, DDG-51, LHD-1, RV TRITON, HSV-X1, etc.), in both towing tanks and at sea. The present invention avails itself of this dynamic pressure data by using order statistics, wherein Weibull distributions are effected for rendering lifetime predictive descriptions relating to this dynamic pressure data. These Weibull-based lifetime predictions are useful for undertaking fatigue and other analyses of structural elements of ships.

Based on the empirical data obtained from model tests and sea trials, a two-parameter Weibull probability distribution (e.g., a Weibull probability density distribution or a Weibull cumulative density function) for lifetime wave-related pressures (impact and green seas) is associated with each cell, each of which is defined in terms of operation profile and sea state. Each Weibull distribution provides a pressure-versus-probability relationship in some form, such as between the variation in the pressure encountered by the ship and the corresponding variation in the probability that such pressure will be exceeded over the course of a given lifetime.

The Weibull distributions (each "cell-specific" Weibull distribution being defined by its slope parameter and scale parameter) are algorithmically combined in various manners that are inclusive of all of the cells. The mathematical aggregation of the individual Weibull distributions can involve or determine any or all of the following relationships, over the course of an expected or designed lifetime of a ship: (a) variation of pressure value in accordance with the number of events that the pressure value is exceeded (wherein, typically, the pressure decreases linearly with increasing number of pressure exceedence events); (b) variation of the number of events (e.g., wave slams) that occur in accordance with the most probable maximum pressure value (wherein, typically, the number of events increases linearly with increasing value of most probable maximum pressure); (c) variation of pressure value in accordance with the probability that the pressure value is exceeded (wherein, typically, the pressure increases non-linearly, positively or concavely, with increasing probability of pressure exceedence).

Figure 2:
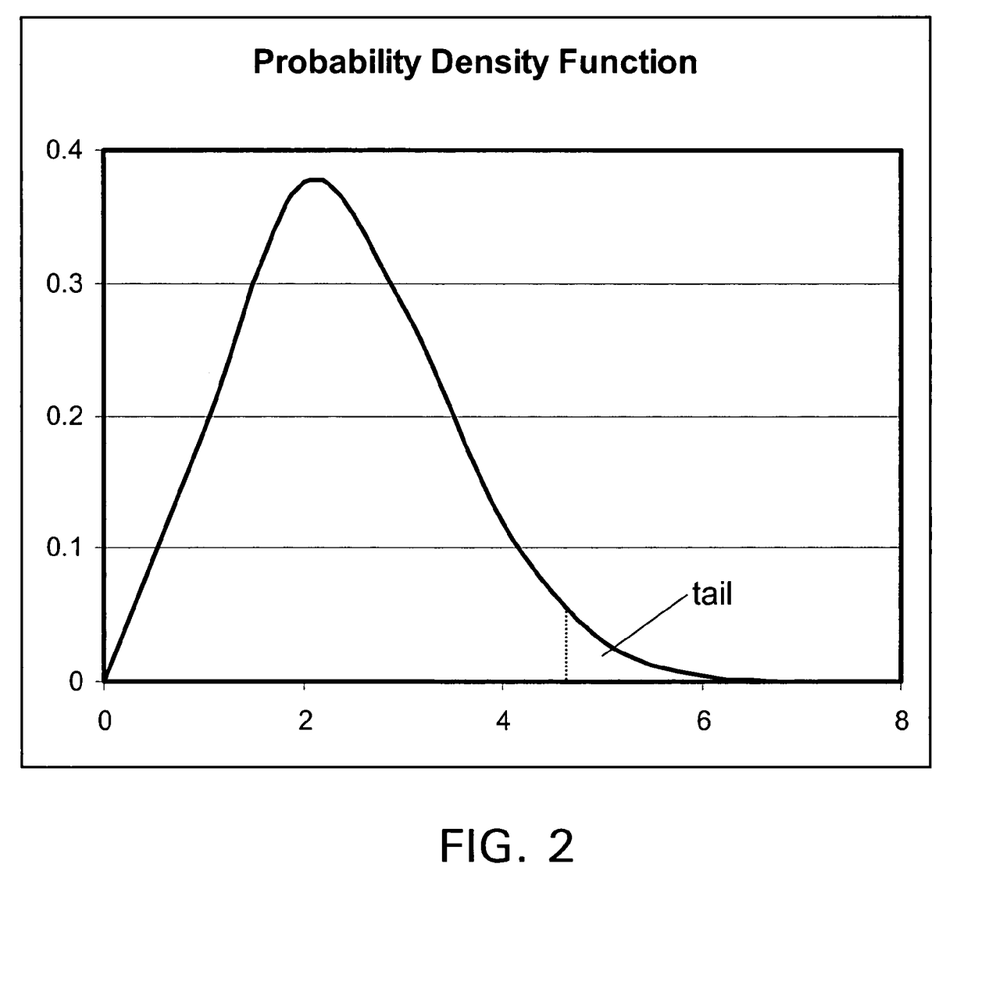
FIG. 2 is a graphical representation that is generally illustrative of a probability density function (pdf) pursuant to Weibull analysis. The cumulative density function (cdf) is the integral of the pdf and relates to the area (which equals one) under the pdf.

With reference to FIG. 2, the probability density function (pdf) for a two-parameter Weibull distribution, p(x), is defined as $$p(x) = \beta/\eta (x/\eta)^{\beta-1} \exp[-(x/\eta)^\beta]$$

where $\eta$ is the "characteristic value" (also known as the "scale parameter") for a random variable x, and $\beta$ is the "shape factor" (also known as the "slope" or "shape parameter") of the Weibull distribution. Experimental slam pressure slopes are generally in the range of 0.5 to 2.0, and tend to cluster around a slope of 1.0, thus characterizing an "exponential distribution."

The cumulative density function (cdf), P(x), is the integral of the pdf $$P(x) = p(x) dx$$

The area under the entire pdf, from zero to infinity, is 1.0. The cdf, P(x), up to a value, x, is therefore $$P(x) = -\exp[-(x/\eta)^\beta]_0^x$$
$$= 1 - \exp[-(x/\eta)^\beta]$$

The cdf can be used to determine the number of events that exceed and are exceeded by a given value of x=pressure $\underline{u}$. Exceedence analysis of this nature is useful for performing fatigue life assessments. The probability of not exceeding $\underline{u}$ is 1−n/N, where "n" is the number of events exceeding $\underline{u}$.

$$P(\underline{u}) = p(x) dx = 1 - n/N \text{ (evaluated from 0 to } \underline{u}\text{)}$$

$$1 - \exp[-(\underline{u}/\eta)^\beta] = 1 - n/N$$

$$N^* \exp[-(\underline{u}/\eta)^\beta] = n$$

Slam pressure $\underline{u}$ is a nominal pressure used to generate an "exceedence histogram" (also referred to herein as an "exceedence curve," "fatigue histogram" or "fatigue curve"). Each "cell" is described both operationally and environmentally. For each individual operational-environmental cell, a "cell-specific" (single-cell) lifetime exceedance histogram of pressures for fatigue analyses is developed by iterating the above equation, $N^* \exp[-(\underline{u}/\eta)^\beta] = n$, for various values of pressure $u$. Each value of $u$ has a number of exceedance events, n, associated with it. For plural (typically, multiple) operational cells, each cell has its own distribution and number of events.

An "overall" (cumulative as to all cells) lifetime exceedence histogram is formed summationally. Each cell-specific exceedence histogram gives the number of exceedance events for each of plural (typically, several or many) given values of pressure $\underline{u}$. For each value of pressure $\underline{u}$, the corresponding cell-specific numbers of exceedence events are added together, thereby forming an overall exceedence histogram over the range of pressures $\underline{u}$ being evaluated. According to typical inventive practice, a histogram having between twenty and twenty-five increments of pressure is adequate for fatigue analyses. Accordingly, the overall lifetime exceedence distribution represents a summation of plural individual cell-specific lifetime exceedence distributions.

The overall lifetime exceedence distribution is thus seen as representing a combination of plural individual cell-specific Weibull distributions, as each cell-specific lifetime exceedence distribution derives from a corresponding cell-specific Weibull distribution. More particularly, each cell-specific lifetime exceedence distribution derives from a corresponding pair of Weibull parameters, viz., scale parameter $\eta$ and shape parameter $\beta$. For each cell, data (taken from ship sea trials and/or model ship testing) is plotted to determine the two Weibull parameters. Each cell may be unique insofar as having a different value, as compared with every other cell, for one or both of its two Weibull parameters. One cell-specific exceedence curve is generated for each cell, wherein plural values of pressure $u$ are used to generate the cell-specific exceedence curve. A single overall exceedence curve is obtained by summing all of the individual data of the plural cell-specific exceedence curves.

For the global hull girder loads, the Navy utilizes the "SPECTRA" program to generate values for both a maximum lifetime load and a load histogram for use in fatigue analyses. See the following references, incorporated herein by reference: Jerome P. Sikora and Robert W. Michaelson., "Programmed Computation of Predicted Loading of Ship Hull," U.S. Pat. No. 6,263,297 B1, issued 17 Jul. 2001; Robert W. Michaelson, *User's Guide for SPECTRA: Version 8.3*, NSWCCD report65-TR-2000/07, face-dated March 2000; Jerome P. Sikora, "Cumulative Lifetime Loadings for Naval Ships," *ASME International Mechanical Engineering Congress and Exposition on Hydroelasticity and Unsteady Fluid Loading on Naval Structures*, Anaheim, Calif., 15–20 Nov. 1998. The present invention's MAXPRES program bears some similarity to the SPECTRA program. The present invention meets the needs of ship designers and reliability analysts insofar as providing similar capabilities that are concerned, not with global hull girder bending associated with ongoing wave activity, but rather with localized structural responses and loads associated with periodic or intermittent wave impact pressures.

The SPECTRA program divides the lifetime operations of a ship into independent cells (assuming a statistically stationary process) corresponding to ranges of wave heights, ship speeds, and headings. Hull girder responses in the frequency domain are multiplied by sea spectra to form response functions for each cell. The response functions are evaluated as Rayleigh probability distributions that are combined to form probability-based extreme hull girder loadings and exceedance distributions. A Rayleigh distribution is particular type of Weibull distribution, wherein the shape parameter $\beta=2$. Sikora 1998 describes the theory embedded in SPECTRA and default algorithms for concept designs when empirical data are unavailable. Michaelson 2000 presents a user's guide for the SPECTRA program.

The design maximum value, $\hat{u}$, for a single Weibull distribution, is that value of x that is exceeded once in a lifetime of N events. It is the most probable maximum value of a distribution, and is referred to as the "maximum lifetime value." It corresponds to the area under tail of the pdf beyond $\hat{u}$, shown in FIG. 2, and is equal to $1/N$, which is the probability of exceeding $\hat{u}$.

The probability of not exceeding $\hat{u}$ is $1-1/N$. The design maximum lifetime pressure value, $\hat{u}$, can be determined from $P(\hat{u})=p(x)dx=1-1/N$ (evaluated from 0 to $\hat{u}$)

$1-\exp[-(\hat{u}/\eta)^{\beta}]=1-1/N$ $\exp[-(\hat{u}/\eta)^{\beta}]=1/N$ $-(\hat{u}/\eta)^{\beta}=\ln(1)-\ln(N)$ $(\hat{u}/\eta)^{\beta}=\ln(N)$ Therefore, $\hat{u}=\eta[\ln(N)]^{1/\beta}$ As disclosed by Sikora 1998, for global loads the maximum lifetime value, $x_{max}$, is determined by summing the tails of Rayleigh distributions from all "k" cells. That is, $x_{max}$ is exceeded a cumulative total of one event by contributions from all of the cells. Each of the cells contributes a fraction of one event, the worst-case cells contributing larger fractions than the benign cells. The present invention extends this approach to the more general Weibull distribution using the above equations. The maximum lifetime pressure, $x_{max}$, from each cell "i" is given by $\exp[-(x_i/\eta_i)^{\beta_i}]=1/N_i$ By summing all "k" cells, the maximum lifetime value is given by $$\sum_{i=1}^{k} \exp[-(x_{max}/\eta_i)^{\beta_i}] N_i = 1.0$$

Inventive practice of the maximum lifetime pressure methodology requires the characteristic value $\eta$, the slope $\beta$, and the number of events N for each operational-environmental cell. Incorporated herein by reference is W Hay and R. Lewis, *A Methodology for the Analysis of Secondary Loads Wave Impact Data and the Development of Structural Design Criteria*, NSWCCD report 65-TR-1997/16, September 1997. Hay et al. present criteria for developing Weibull parameters from experimental data. The preferred approach for determining the number of events N is to input the slam rate $R_i$ for each cell. Then, the number of events N can be calculated as functions of lifetime at sea T, wave height probabilities Pwh, heading probabilities Phd, and speed probabilities Psp.

$N_i=R_i*T*Pwh*Phd*Psp$

To recapitulate, the maximum lifetime pressure $\hat{u}$ is the most probable maximum pressure over the course of a lifetime, i.e., the slam pressure likely to be exceeded once in the lifetime of a ship. For a cell-specific (single-cell) Weibull distribution, the inventive practitioner's prediction of a single maximum pressure value $\hat{u}$ is based upon the integration of the cdf, in accordance with the above-stated equation $P(\hat{u})=p(x)dx=1-1/N$. For a single cell, the most probable maximum pressure $\hat{u}$ is a function of the two Weibull parameters and the number of events in a lifetime, in accordance with the above-stated equation $\hat{u}=\eta[\ln(N)]^{1/\beta}$. In accordance with the above-stated equation $\exp[-(x_{max}/\eta_i)^{\beta_i}]N_i=1.0$, all of the individual tails of the cell-specific Weibull distributions are summed (integrated) such that the sum of the tails corresponds to the $1/N$, which is one over the total number of events, thereby obtaining a combined maximum pressure value $\hat{u}$ that is essentially based on a combined cdf for all of the cells.

Corresponding probabilities can be assigned to various extreme values of pressure. The reliability, or cumulative probability of not exceeding a given value of x, (F(n)), for the largest value in an ordered set "n," is defined as the cdf raised to the n power $$F(n)=[P(x)]^n$$

For two-parameter Weibull distributions, F(n) can be written as $$F(n)=\{1-\exp[-(x/\eta)^\beta]\}^n$$

for a single distribution; see R. Lewis, *An Assessment of Statistical Techniques and Current Assumptions for Analysis of Hull Girder Bending Response Time Histories*, NSWCCD report SSM-65-95/33, May 1995, incorporated herein by reference. The pdf of the largest value of a sample should be interpreted as the distribution of the largest of N values taken from K tests under the same conditions. Even though the population statistics do not change, if the process is stationary, then each individual sample will contain a different set of values. As a result, the set of largest values from each of the K samples will have its own distribution. This distribution of largest values is defined as the extreme value distribution.

Incorporated herein by reference is W. Richardson, "A Probability Based Load Estimation Technique for Ship Structure Design and Technology Evaluation," *Naval Engineers Journal*, pp 150–164, May 1987. Richardson has shown that for multiple cells, the net cumulative reliability (Fnet) is the product of the individual reliabilities.

$$F\text{net}=F_i(n_i)=\{1-\exp[-(x/\eta_i)^{\beta_i}]\}^{n_i}$$

$$i=1,k$$

By iterating over various values of x, one can find extreme values corresponding to any desired cumulative reliability. Thus, in order to achieve a single-cell reliability, probability determinations are iterated over different values of pressure x. The net (overall) probabilities are found, not by summing, but by multiplying the individual (cell-specific) probabilities.

Generally, ship structures include grillages that include plating supported by stiffeners. The stiffeners are spaced about two to three feet apart, and are supported by frames that are spaced about four to twelve feet apart. Incorporated herein by reference are the following three references: W Hay et al., *Structural Loads and Fatigue Assessment for the T-AGOS 19 Based upon Model Tests*, DTNSRDC report SSPD-88-173-16, December 1987; D. Bruchman and A. Dinsenbacher, *Permanent Set of Laterally Loaded Plating: New and Previous Methods*, DTRC report SSPD-91-173-58, May 1991; D. Kihl and J. Adamchak, *A Summary of Stiffener Tripping Criteria*, NSWCCD report 65-TR-2001/16, August 2001. In the design of the T-AGOS 19, Hay 1987 recommends risk factors based upon the consequence of failure for each structural element.

For metal plating, structural failure can be defined as yielding. The consequence of a yielding failure is a permanent dishing of the plating. Although such dishing reduces the carrying capacity of the section in primary loading, the stiffeners can take up the load preventing catastrophic failure. In addition, because of membrane behavior, the plating can deform large amounts before rupture ensues. The U.S. Navy's design criteria define three values for a coefficient, corresponding to "no permanent set," "some set," and "permanent set." These coefficients are functions of material type but do not quantify the amount of set. Furthermore, they are used with very low applied pressures. Bruchman et al. show that the coefficient for "some set" is still within the elastic range, and that designing a plate to "permanent set" results in deformations on the order of one percent of the plate width. Bruchman et al. present alternative design equations so that plating can be designed elastically or to any desired level of plastic deformation. Following the risk factors suggested by Hay 1987, recommended inventive practice is that the maximum lifetime pressure be used with Bruchman et al.'s equations to design plating.

Stiffener failure may be either a yielding of the material or a geometric buckling. The consequence of stiffener failure is the loss of some primary hull girder load-carrying capacity. This is the level of damage at which structural failure is universally considered to have occurred. Hay 1987 suggests avoiding this undesirable consequence by designing the stiffeners to a pressure having a risk factor 0.01 (cumulative reliability=0.99) for the presumed worst operating cell. The method proposed in this report allows the prediction of extreme pressures with contributions from all of the cells; hence, it is more conservative than a single worst cell approach. Work is ongoing (See, e.g., Kihl) to develop more accurate stiffener tripping criteria, coupled with better estimates of extreme loadings. This endeavor suggests a potentiality for designing stiffeners to a somewhat less conservative risk factor. Additional work remains to be done to select appropriate risk factors for stiffeners.

The consequences of frame collapse include the loss of structural effectiveness of the grillage, which, under certain circumstances, can lead to the loss of an entire ship section under primary loading. Hay 1987 suggests avoiding this collapse mechanism by designing the grillage to an extreme pressure having a risk factor of 0.001 (cumulative reliability=0.999). As with stiffeners, additional reliability analyses should be performed to set appropriate risk factors for frames.

With regard to pressure area effects, design pressures must be associated with areas appropriate to the structural element. Since a panel consists of plating supported by stiffeners and frames, it should be loaded by a uniform patch equal to the frame spacing times the stiffener spacing. Similarly, stiffeners are supported by frames and are loaded by the plating extending one-half stiffener spacing on either side. Hence, stiffeners have the same patch size (i.e., a panel) as the plating. The frames, on the other hand, are subjected to loading by a patch corresponding to the entire grillage area (the frame spacing times the width of the grillage).

The larger the area acted upon, the lower the average pressure; see, e.g., R. Allen and R. Jones (1977) "A Simplified Method for Determining Structural Design: Limit Pressures on High Performance Vehicles," American Institute of Aeronautics and Astronautics and Society of Naval Architects and Marine Engineers (AIAA/SNAME), Paper 78–754, April 1977, incorporated herein by reference. Allen et al. also provide design curves, based on data from several high performance craft, for reducing the average pressure with patch size. Incorporated herein by reference is Jerome P. Sikora, "Design Algorithms for Primary and Secondary Loads on SWATH Ships," *Naval Engineers Journal*, pp 121–127, May (1995). Sikora 1995 develops the following design algorithms for converting from one patch size to another using Allen et al's curves. For a maximum pressure (Pmax), as developed from MAXPRES, the effective design pressure (Pplating, Pstiffener, or Pgrillage) applied to the desired structural element is $P\text{plating} = P\text{max-life} * Kp/Kn$ $P\text{stiffener} = P\text{max}(0.99) * Kp/Kn$ $P\text{grillage} = P\text{max}(0.999) * Kg/Kn$ Kn is a function of the nominal patch size ($A_n$=area of the pressures input to MAXPRES). Kp is a function of the panel size ($A_p$=stiffener spacing*frame spacing) and Kg is a function of the grillage size ($A_g$=frame spacing*grillage width).

$Kn, Kp, \text{ or } Kg = 1.0 \quad \text{for } A/Ar < 0.00025$ $= 0.2776 + 0.0154(-\text{Log}_{10}[A/Ar])^3 \quad \text{for } 0.00025 < A/Ar < 0.226$ $= 0.09 + 0.37(-\text{Log}_{10}[A/Ar])^{1.5} \quad \text{for } 0.226 < A/Ar < 1.0$ where
  Ar=reference area=0.06*Lb*B
  Lb=ship length between perpendiculars (monohulls) or box length (twin hulls)
  B=total ship breadth
  A=$A_n$, $A_p$, or $A_g$ as appropriate It is noted that A and Ar must be in consistent units.

The above pressure area relationships are internal in the present invention's MAXPRES computer program, so the user need only provide the areas for the input pressures and the desired areas of the structural elements. The factors (Kp/Kn and Kg/Kn) for increasing or decreasing the output pressures will be provided. The maximum effective design pressures Pplating, Pstiffener, and Pgrillage come from the inventive MAXPRES itself and are defined as follows:

Pmax-life=maximum lifetime pressure, in accordance with the above-stated equation $$\prod_{i=1}^{k} \exp[-(x_{max}/\eta_i)^{\beta_i}] N_i = 1.0$$

Pmax(0.99)=extreme pressure with a cumulative reliability of 99%, in accordance with the above-stated equation $$F\text{net} = F_i(n_i) = \prod_{i=1,k} \{1 - \exp[-(x/\eta_i)^{\beta_i}]\}^{n_i}$$

Pmax(0.999)=extreme pressure with a cumulative reliability of 99.9%, in accordance with the above-stated equation $$F\text{net} = F_i(n_i) = \prod_{i=1,k} \{1 - \exp[-(x/\eta_i)^{\beta_i}]\}^{n_i}$$

Hence, the inventive practitioner can readily determine the effective engineering pressures that are applied as static uniform pressures to the appropriate structural elements for design.

Reference now being made to FIG. 3 through FIG. 8, the inventive MAXPRES is a Windows-based computer program that computes, inter alia, extreme pressures and lifetime exceedance histograms. Computations are based on the input parameters and data sources specified by the user. As portrayed in FIG. 3, all inputs are located in the top frame of a file window, while output is displayed in the lower frames. Inputs describe the number of days at sea and the type of environment in which it will operate. Similar pull down menus for operational profiles and sea state probabilities that are in SPECTRA (as described by the aforementioned Michaelson 2000) are also in the inventive MAXPRES. Outputs showing the expected pressures can be displayed as an exceedance list of maximum lifetime pressures, histogram for fatigue, or pressures as a function of extreme probabilities.

With regard to the inputting of information, first the user enters, in the boxes at the top of the window, the ship's name and the number of days at sea in the expected lifetime of the ship. Next, the user selects sea state probabilities and operational profiles (FIG. 4 depicts a sample operational profile file for a high-speed sealift ship) from the pull-down menu. Then, the user selects a data input file, such as the sample data input file illustrated in FIG. 5. The first column is ship speed (knots), followed by heading (degrees on bow), significant wave height (meters), Weibull slope, Weibull characteristic value, and slam rate (slams/hour). According to typical inventive practice, the marine vessel's heading represents the horizontal direction in which the marine vessel is pointed, expressed as an angular distance from a reference direction, viz., the wave direction. As illustrated in FIG. 4, a zero degree heading is at the wave direction, and a one hundred eighty degree heading is opposite the wave direction. The heading is indicated in the range between 0 degrees and 360 degrees, the angular distance increasing clockwise through 360 degrees.

Figure 3:
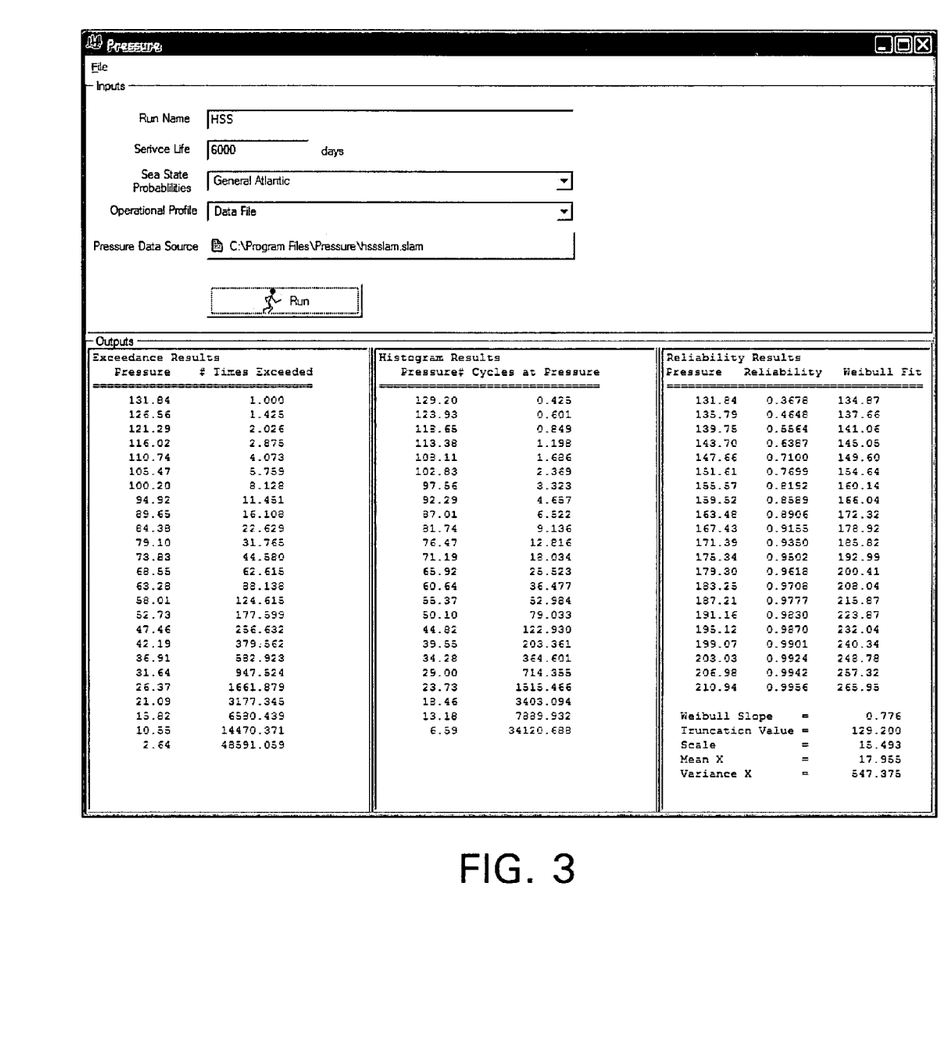
FIG. 3 is a pictorial representation of a user interface (with sample values shown) for the present invention's prototypical MaxPres program.
Figure 5:
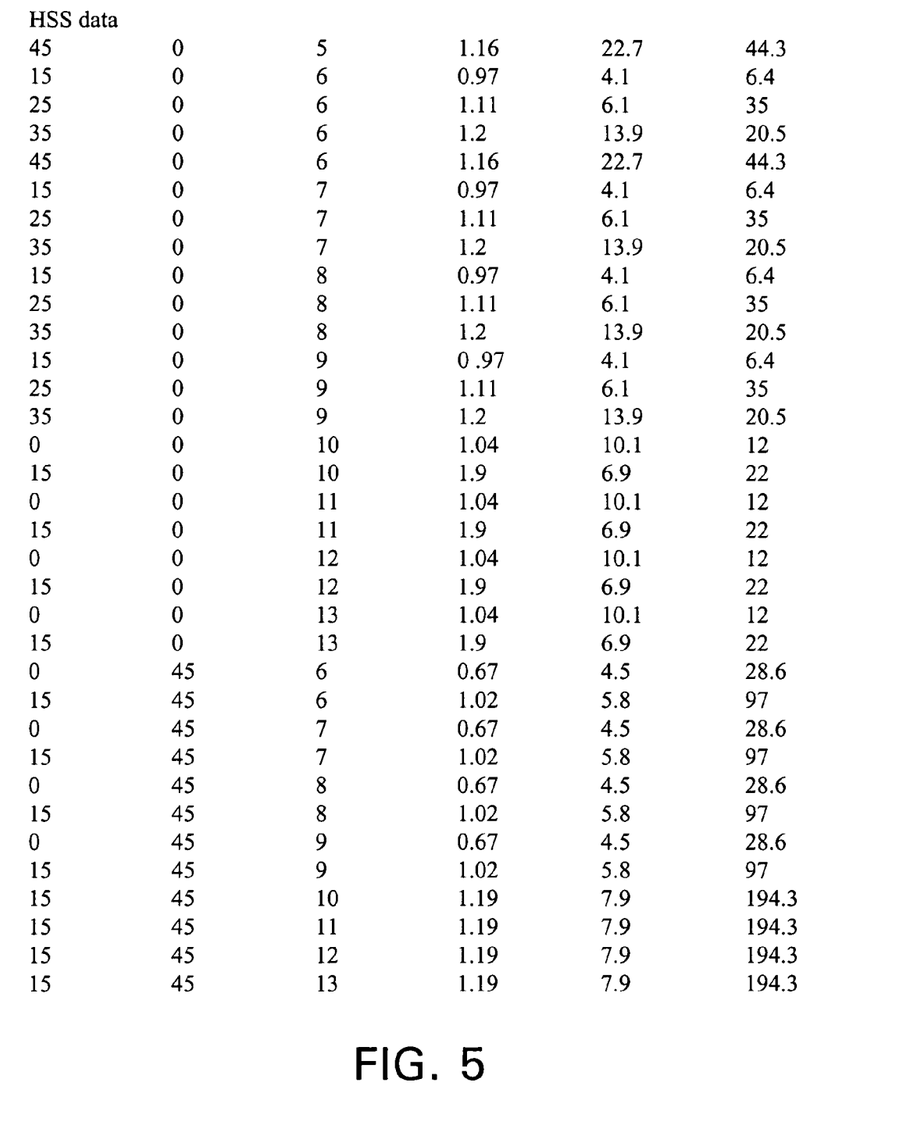
FIG. 5 is a tabular representation of sample slam parameter data such as may be input in accordance with the present invention's prototypical MaxPres program.
Figure 6:
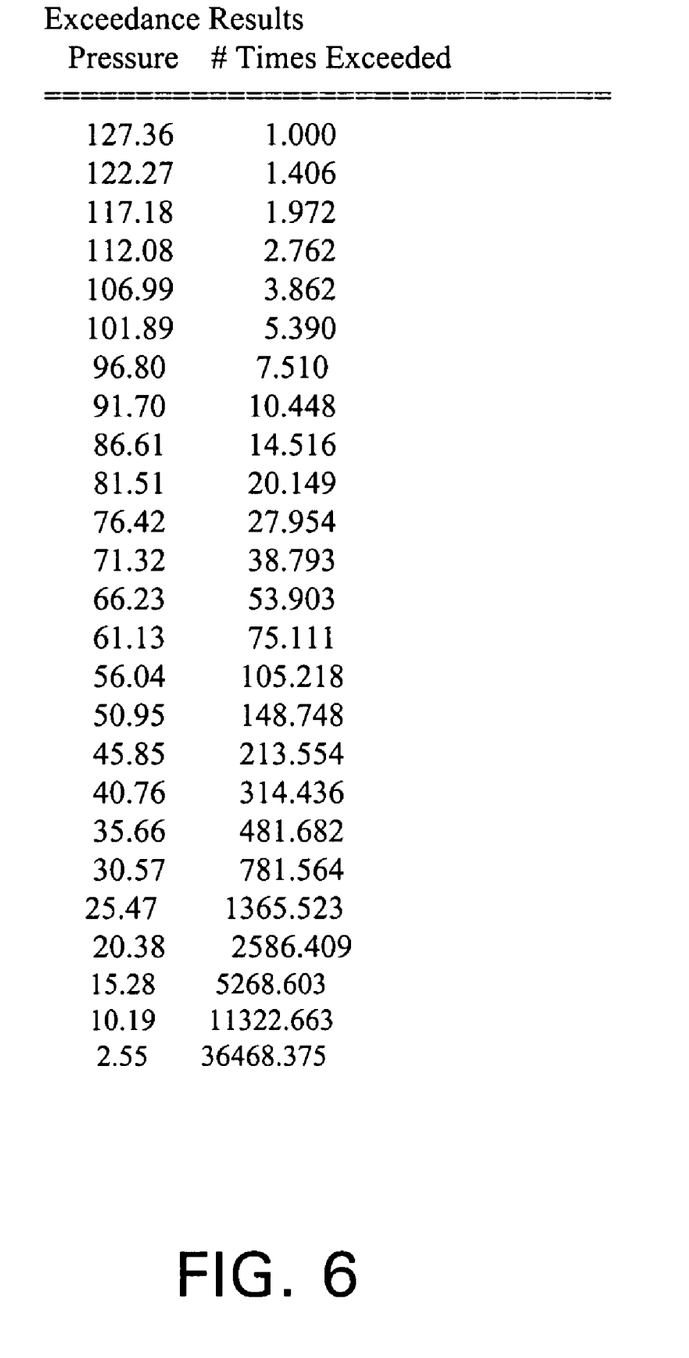
FIG. 6 is a tabular representation of sample dimensionless exceedence pressure data such as may be output in accordance with the present invention's prototypical MaxPres program.

With regard to the outputting of information, the output pressures appear in the three columns at the bottom of the file window, such as shown in FIG. 3. The first column lists pressures and the number of times they are exceeded. FIG. 6 presents an example of the exceedance pressures. The maximum value (127.36) is exceeded once in the expected life of the ship, and has been calculated by MAXPRES using the above-stated equation $$\prod_{i=1}^{k} \exp[-(x_{max}/\eta_i)^{\beta_i}] N_i = 1.0$$

Figure 7:
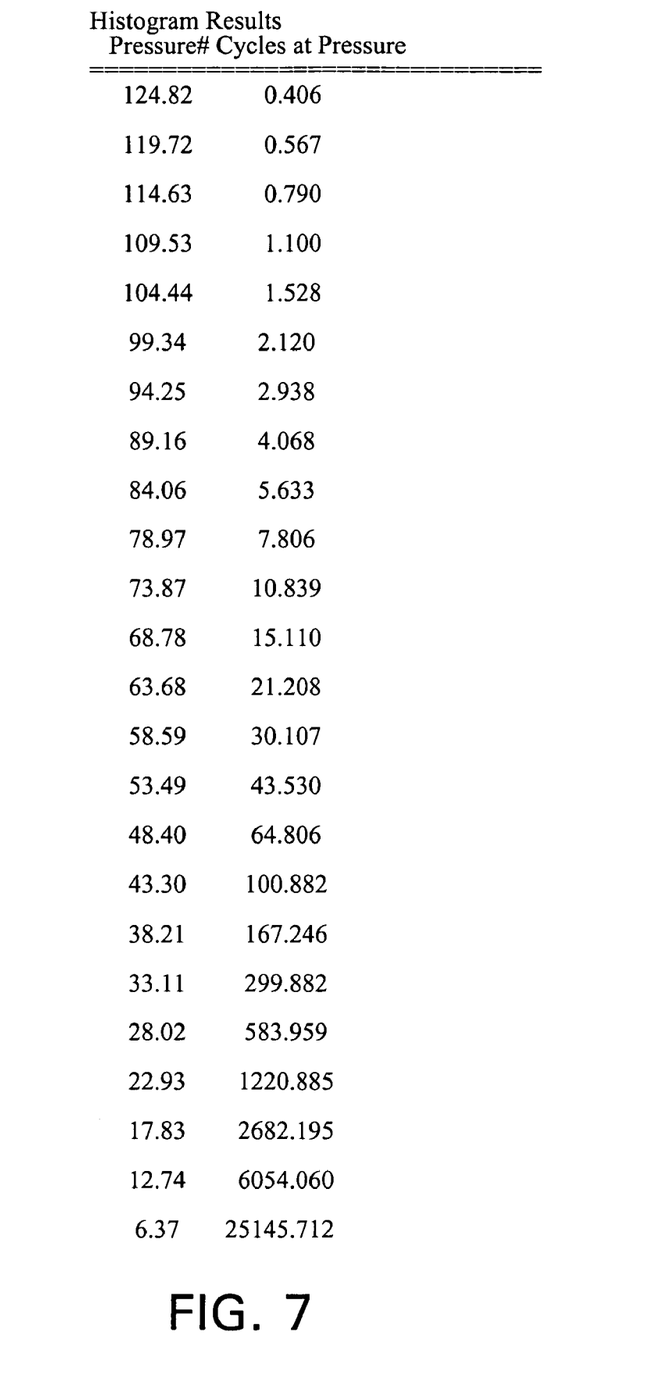
FIG. 7 is a tabular representation of sample dimensional exceedence pressure histogram data such as may be output in accordance with the present invention's prototypical MaxPres program.
Figure 8:
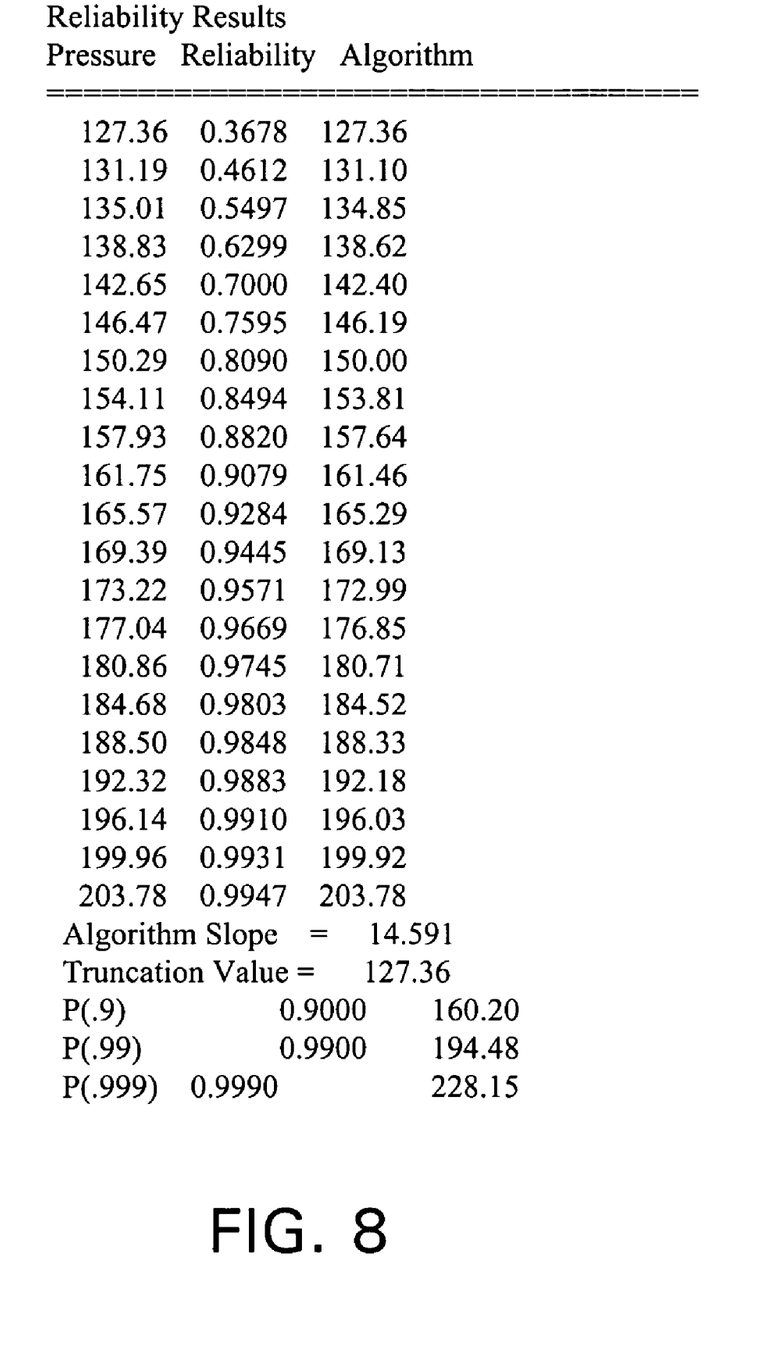
FIG. 8 is a tabular representation of sample reliability data such as may be output in accordance with the present invention's prototypical MaxPres program.

The second column of FIG. 3 shows the conversions of the exceedance pressures into histograms for fatigue analyses. FIG. 7 shows an example of a lifetime pressure histogram. The third column of FIG. 3 shows a list of extreme pressures with their corresponding reliabilities (wherein the reliability is the probability that the pressure will not be exceeded during the given lifetime). FIG. 8 shows an example of reliabilities as derived from the above-stated equation $$F\text{net} = F_i(n_i) = \prod_{i=1,k} \{1 - \exp[-(x/\eta_i)^{\beta_i}]\}^{n_i}$$

Shown at the bottom of FIG. 8 are parameters for a Weibull distribution; such Weibull parameters can be used to interpolate or extrapolate the reliabilities for any given pressure.

The present invention provides a design tool that is useful in association with existing databases (e.g., model test databases and/or sea trial databases) for dynamic pressures and slam rates. In order to more effectively practice the present invention, existing model test and sea trial databases can be analyzed to more expansively determine Weibull distributions and slam rates; that is, since experimental data is limited, an interpolation and/or extrapolation scheme can be implemented to fill in the missing operational and environmental cells. Thus, it is more practical for concept design studies if default algorithms are provided for predicting probability distributions when empirical data do not exist. This can be accomplished by analyzing the results of model tests previously conducted in a towing tank, sea trials on ships, as well as analytically generated response time histories for hydrodynamic impact-related pressures. Analytical codes for predicting pressures and slam rates can be evaluated against measured data. First-principle formulations can help guide the interpolation and extrapolation efforts toward expanding the number or range of cells. Based upon such analyses, algorithms can be developed to determine Weibull pressure probability distributions for all of the operational cells, thereby resulting in a complete set of probability distributions for specific locations on the ship classes already tested.

A comprehensive user's manual along the lines of Michaelson's *User's Guide for SPECTRA: Version 8.3* would also be helpful to the user of the current or any future inventive MAXPRES embodiment. According to the current embodiment of the present invention's MAXPRES program, data pertaining to Weibull pressure distributions are part of the input. Alternative inventive embodiments of a computer program product can provide for inclusion of the entire database of Weibull pressure distributions for existing ships. Other inventive embodiments can include the algorithms for Weibull pressure distributions, thus permitting the user to perform concept studies by merely inputting the general ship characteristics and getting out design pressures at different locations on the ship. Algorithms for predicting Weibull pressure distributions for other ships can be developed from existing databases as well as from supplements from validated analytical codes. Such algorithms would be functions of ship characteristics such as ship type (monohull combatants, catamarans, etc.), length, beam, draft, displacement, etc. These algorithms would be conceptually similar to the universal RAO and whipping algorithms in the SPECTRA program. With regard to the application program interface (API), the current embodiment of the inventive MAXPRES program uses a Microsoft Windows single document interface (SDI); however, some inventive embodiments may preferably use a multiple document interface (MDI) that permits simultaneous opening of plural (e.g., many) windows, files or documents.

Other embodiments of the present invention will be apparent to those skilled in the art from a consideration of this specification or practice of the invention disclosed herein. Various omissions, modifications and changes to the principles described herein may be made by one skilled in the art without departing from the true scope and spirit of the present invention, which is indicated by the following claims.

What is claimed is:

1. A method for assessing the fitness of a structure to withstand pressure loading occasioned by environmental interaction with said structure, said method comprising:
    establishing plural cells, each said cell containing information pertaining to at least one condition, said at least one condition including at least one environmental condition that is capable of affecting said structure;
    associating each said cell with a Weibull distribution that relates said pressure loading to the probability of exceeding said pressure loading; and
    combining all of said Weibull distributions, said combining including determining an overall character of said structure with respect to said pressure loading.

2. The method of claim 1, wherein said associating includes defining said Weibull distribution in terms of a Weibull shape parameter and a Weibull scale parameter, and wherein said combining includes performing mathematical computation that considers all of said Weibull shape parameters and all of said Weibull scale parameters.

3. The method of claim 2, wherein said structure is a vehicle, and wherein said at least one condition includes at least one operational condition of said vehicle.

4. The method of claim 2, wherein said structure is a marine vessel, and wherein said at least one condition includes at least one operational condition of said marine vessel.

5. The method of claim 4, wherein:
    said at least one environmental condition includes at least one environmental condition selected from the group consisting of wave height and wave slam rate; and
    said at least one operational condition includes at least one operational condition selected from the group consisting of marine vessel speed and marine vessel heading.

6. The method of claim 5, wherein said determining of said overall character includes determining how said pressure loading varies in accordance with the number of times that said pressure loading is exceeded.

7. The method of claim 5, wherein said determining of said overall character includes determining how the number of wave slam events varies in accordance with the most probable maximum value of said pressure loading.

8. The method of claim 5, wherein said determining of said overall character includes determining how said pressure loading varies in accordance with the probability that said pressure loading is exceeded.

9. A computer program product for residence in memory of a computer, said computer program product being for providing output of lifetime information relating to pressure associated with sea wave activity with respect to a marine vessel, said computer program product comprising a computer useable medium having computer program logic recorded thereon, said computer program logic including:
    means for enabling input of pressure-related information so as to be grouped in accordance with a plurality of informational cells, said pressure-related information including sea state information, operation profile information and Weibull information, each said cell including corresponding said sea state information and corresponding said operation profile information, each said cell being characterized in terms of corresponding said Weibull information that includes two parameters of a Weibull distribution as a function of pressure, said two parameters being characteristic value and slope factor; and means for enabling calculation of at least one lifetime relationship that involves said pressure and that is indicative regarding structural failure of said marine vessel, each said lifetime relationship being comprehensive as to all of said cells, said calculation generally being representative of a summation of all of said Weibull information corresponding to every said cell.

10. The computer program product of claim 9, wherein said calculation includes algorithmically applying the corresponding said characteristic values and the corresponding said slope factors of all of said cells.

11. The computer program product of claim 9, wherein:
said sea state information includes marine vessel speed information and marine vessel heading information;
said operation profile information includes wave height information and wave slam rate information.

12. The computer program product of claim 9, wherein said at least one lifetime relationship includes a relationship between pressure and the number of lifetime pressure exceedence events.

13. The computer program product of claim 9, wherein said at least one lifetime relationship includes a relationship between the number of lifetime wave slam events and the maximum lifetime pressure value.

14. The computer program product of claim 9, wherein:
said sea state information includes marine vessel speed information and marine vessel heading information;
said operation profile information includes wave height information and wave slam rate information; and
said calculation includes algorithmic application of the corresponding said characteristic values and the corresponding said slope factors of all of said cells.

15. The computer program product of claim 14, wherein said at least one lifetime relationship includes a relationship between pressure and the number of lifetime pressure exceedence events.

16. The computer program product of claim 14, wherein said at least one lifetime relationship includes a relationship between the number of lifetime wave slam events and the maximum lifetime pressure value.

17. A computer program product for residence in memory of a computer, said computer program product being capable of providing output of lifetime information relating to pressure encountered by a marine vessel in association with sea wave activity, said computer program product comprising a computer useable medium having computer program logic recorded thereon, said computer program logic including:
means for enabling input of empirical pressure information into each of at least two informational cells, said empirical pressure information describing variation of pressure encountered by said marine vessel in accordance with sea state and operation profile;
means for enabling characterization of each said cell in terms of a corresponding Weibull distribution as a function of pressure, each said Weibull distribution describing a characteristic value and a slope factor, each said characterization being based upon some said empirical pressure information input into the corresponding said cell; and
means for enabling calculation of at least one lifetime relationship that involves said pressure and that is indicative regarding structural failure of said marine vessel, each said lifetime relationship being comprehensive as to all of said cells, said calculation generally being representative of a summation of all of said Weibull distributions corresponding to every said cell.

18. The computer program product of claim 17, wherein:
said sea state includes marine vessel speed and marine vessel heading;
said operation profile includes wave height and wave slam rate; and
said calculation includes consideration of said characteristic values and said slope factors.

19. The computer program product of claim 18, wherein said at least one lifetime relationship includes at least one of:
a relationship between pressure and the number of lifetime pressure exceedence events; and
a relationship between the number of lifetime wave slam events and the maximum lifetime pressure value.

20. The computer program product of claim 19, wherein said empirical pressure information derives from at least one of marine vessel sea trials and marine vessel model tests.

21. The computer program product of claim 17, wherein no two said cells have the identical said empirical pressure information input therein.

* * * * *